DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1365

T889,014

HEAT-STABILIZED SILVER HALIDE PRINTOUT PHOTOGRAPHIC MATERIAL

Deborah E. Beach, 229 E. 21st St., New York, N.Y. 10010, and Cynthia Geer Ulbing, Kodak Park, Rochester, N.Y. (Fairport, N.Y. 14450)

Filed Sept. 18, 1970, Ser. No. 73,598
**Int. Cl. G03c *1/28***
U.S. Cl. 96—108
No Drawing. 13 Pages Specification

It is disclosed that direct-print photographic emulsions containing silver halide grains formed in the presence of trivalent metal ions and having a halogen acceptor contiguous to said silver halide grains, such as those disclosed by Bacon and Barbier, U.S. Pat. 3,447,927, issued June 3, 1969, are improved by the addition of a thiapyrylium compound. Exemplary thiapyrylium compounds which may be used are those having the formulas.

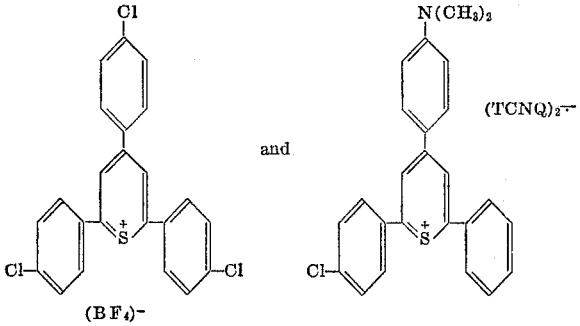

wherein TCNQ represents the tetracyanoquinodimethan radical. Additional thiapyrylium compounds, as disclosed in Rauner et al. U.S. Pat. 3,330,314, issued Jan. 24, 1967, may be employed.

An example of a suitable halogen acceptor is one having the formula

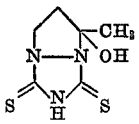

Additional halogen acceptors such as those disclosed in Bacon and Barbier, U.S. Pat. 3,447,927 may be employed.

An improvement is noted in that lower minimum density, increased contrast, and shorter exposure latitude are obtained.

A similar beneficial effect is obtained by the addition of diphenylnitrone to emulsions of this type, particularly in the presence of a spectral sensitizing dye.

Silver halide emulsions and elements described contain silver halide grains formed in the presence of a trivalent metal ion, such as antimony, bismuth, arsenic, gold, iridium, or rhodium. They may contain dispersing agents, coating aids, plasticizers, sensitizing dyes, hardeners and other suitable addenda as described in said U.S. Pat. 3,447,927 of Bacon and Barbier.